B. P. PENDEXTER.
Corn Sheller and Bean Thrasher.

No. 55,899.  Patented June 26, 1866.

WITNESSES

INVENTOR

UNITED STATES PATENT OFFICE.

BENJAMIN P. PENDEXTER, OF MECHANIC FALLS, MAINE.

IMPROVEMENT IN CORN-SHELLER AND BEAN-THRASHER.

Specification forming part of Letters Patent No. 55,899, dated June 26, 1866.

*To all whom it may concern:*

Be it known that I, B. P. PENDEXTER, of Mechanic Falls, Androscroggin county, State of Maine, have invented a new and Improved Corn-Sheller and Bean-Thrasher; and I do hereby declare that the following is a full, clear, and exact description thereof, which will enable others skilled in the art to make and use the same, reference being had to the accompanying drawing, forming part of this specification, in which—

Figure 2:
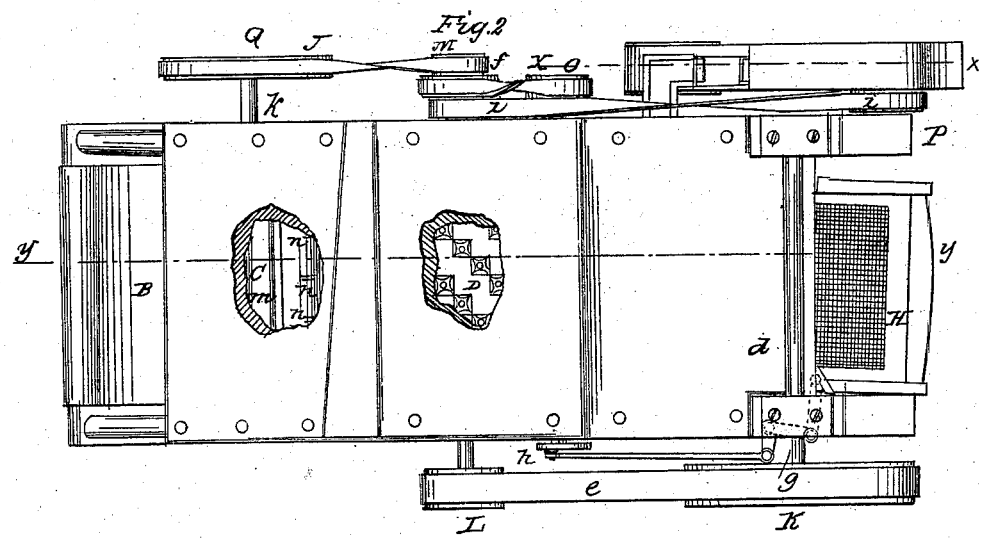
Figure 1:
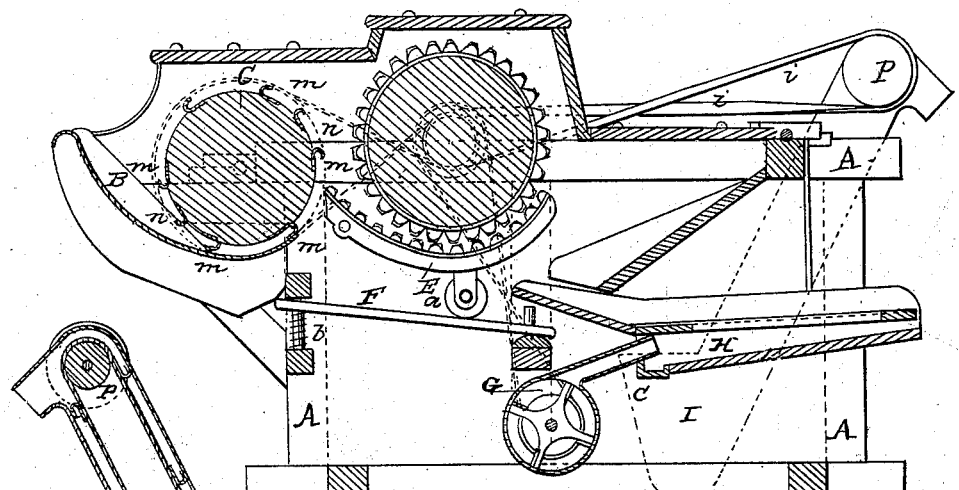
Figure 3:
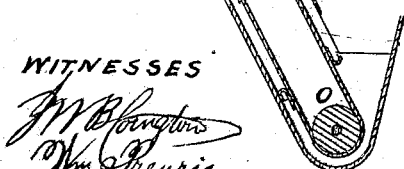

Figure 1 is a sectional inside view taken in the line $y\,y$, Fig. 2. Fig. 2 is a top view, some parts inside being exposed. Fig. 3 is a longitudinal section of bucket-elevator, taken in the line $x\,x$, Fig. 2.

Similar letters of reference indicate like parts.

The nature of my invention consists of a combination and connection of devices with each other constructed and arranged so that together they form a strong, compact, and effective corn-shelling and bean-thrashing machine or grain cleaner of great practical convenience and utility.

The frame A, Fig. 1, is made as usual of hard wood in rectangular form, the working parts boxed in at the sides and top and open at bottom. B is the hopper. C is a revolving feeding-drum with longitudinal buckets $m$ and hooks $n$ on the outside, the peculiar offices of which will be hereinafter explained. D is the corn-shelling toothed cylinder or beater, which revolves over a corresponding concave elastic-toothed bed E, made in sections, which is supported by a friction-roller, $a$, underneath upon a set of elastic bed-plates or levers F, which rest upon a set of spiral springs, $b$, at one end and play loosely on pivots at the other end, bearing up the concave-toothed bed E against the cylinder D. G is a fan which leads to the sieve H, that drops the clean corn into the box $c$, which leads to an endless-bucket elevator, I, placed on the outside of the frame of the machine and boxed up, leading to the top, where the corn is discharged into a bag attached to the mouth of the elevator.

The driving-pulley K on the shaft $d$ is placed at the top of the machine, and operated by hand or horse-power, which communicates motion by a straight belt, $e$, to the pulley L on the shaft, which revolves the corn-shelling cylinder D, on the other end of which shaft is an arbor, M, which gives motion to the cross-belt $f$, to the pulley O at the bottom of the machine, which works the fan G, and also the sieve-shaking apparatus $g$, by the crank $h$ on the opposite side of the machine. The arbor M gives motion also to the elevator-pulley P at the top of the machine by the cross-belt $i$. It also communicates motion by the cross-belt $j$ to the pulley Q on the shaft $k$ of the feeding-drum C.

To operate the machine when it is in motion, the ears of corn or bean-pods are thrown into the hopper A promiscuously, when they fall to the bottom on the sloping side of the hopper until they come in contact with the buckets $m$ on the drum C and catch in them. The ears of corn will take a position in them lengthwise, the buckets being so constructed in cup form as to hold them and carry them up and over by the revolution of the drum to the opposite side, where they are discharged upon the toothed elastic bed E, and under the toothed cylinder D, between which they are broken, and the grains of corn separated from the cob, the bed E being kept up so that it presses the ears of corn against the toothed cylinder D by the spiral spring $b$. As a provision against the ears of corn not readily taking a horizontal position in the buckets, there are two rows of hooks, $n$, on the drum C, between the buckets, which pick up the stragglers and throw them up in the hopper again till they get caught by the buckets. The broken cobs or beans and pods again pass from the bed E to the sieve H, where the lighter parts and trash of the cob are blown away by the fan, and the grain is sifted into the bottom of the elevator I, which carries it up and discharges it at the top into a bag or otherwise. The whole operation is continuous and the corn is delivered clean.

Having described my invention, I claim as new and desire to secure by Letters Patent—

Combining the feeding-drum C, having horizontal buckets $m$ and hooks $n$ on the outside, with the toothed beater D, the elastic concave-toothed bed E, made in sections, the elastic bed-plates E, supported and operated by the spiral springs $b$, the fan G, the sieve H, and the elevator I, the whole several parts being constructed, connected, and arranged substantially as and for the purposes herein described.

BENJ. P. PENDEXTER.

Witnesses:
THOMAS HILLMAN,
FRANK A. MILLEN.